US009609085B2

(12) United States Patent
Liverance et al.

(10) Patent No.: US 9,609,085 B2
(45) Date of Patent: Mar. 28, 2017

(54) BROADCAST-BASED UPDATE MANAGEMENT

(75) Inventors: Fletcher Liverance, Kent, OH (US); Timothy J Freese, Niwot, CO (US); William C Bredbenner, Wynnewood, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1561 days.

(21) Appl. No.: 13/193,452

(22) Filed: Jul. 28, 2011

(65) Prior Publication Data

US 2013/0031226 A1    Jan. 31, 2013

(51) Int. Cl.
G06F 15/16 (2006.01)
H04L 29/08 (2006.01)
G06F 9/445 (2006.01)
H04L 12/18 (2006.01)

(52) U.S. Cl.
CPC ............... *H04L 67/34* (2013.01); *G06F 8/65* (2013.01); *H04L 12/18* (2013.01)

(58) Field of Classification Search
CPC ................ H04L 65/40; H04L 63/04

USPC .................................................. 709/221, 223
See application file for complete search history.

(56) References Cited

U.S. PATENT DOCUMENTS

| 7,555,749 B2 | 6/2009 | Wickham et al. |
| 2005/0034114 A1 | 2/2005 | Weik et al. |
| 2006/0069753 A1* | 3/2006 | Hu et al. ......................... 709/220 |
| 2006/0075001 A1 | 4/2006 | Canning et al. |
| 2008/0163227 A1 | 7/2008 | Son et al. |
| 2009/0291631 A1* | 11/2009 | Xue et al. ..................... 455/3.01 |
| 2010/0251206 A1 | 9/2010 | Horiuchi et al. |

* cited by examiner

*Primary Examiner* — Adnan Mirza
(74) *Attorney, Agent, or Firm* — HP Inc. Patent Department

(57) ABSTRACT

A first computing device establishes an update service associated with an identifier. When the first computing device receives a broadcast message from a second computing device that includes a network address of the second computing device, the first computing device transmits to the network address a message including the identifier associated with the update service. The update service receives from the second computing device a request including the identifier and in return transmits to the second computing device information about available updates.

18 Claims, 7 Drawing Sheets

BROADCAST-BASED UPDATE MANAGEMENT

BACKGROUND

It is often desirable to provide computer systems with software updates designed to fix problems (e.g., security vulnerabilities) or to improve the usability or performance on the computer systems. A computer system typically receives an update from a server and then installs the update.

DETAILED DESCRIPTION

The present subject matter is now described with reference to the accompanying figures, in which several embodiments of the subject matter are shown. The present subject matter may be embodied in many different forms and should not be construed as limited to the embodiments set forth herein. Rather these embodiments are provided no that this disclosure will be complete and will fully convey principles of the subject matter.

An update server is set up to listen to a predetermined port for broadcast messages, and respond to the broadcast messages with an identifier of an update service. The update service listens for messages requesting available updates, and provides information about the available updates in response. The administrator may store update packages in the update server (e.g., a file server) without knowledge of how updates are triggered or administration using server side update management tools, and thereby the management and distribution of updates both may be simplified.

Figure 1:
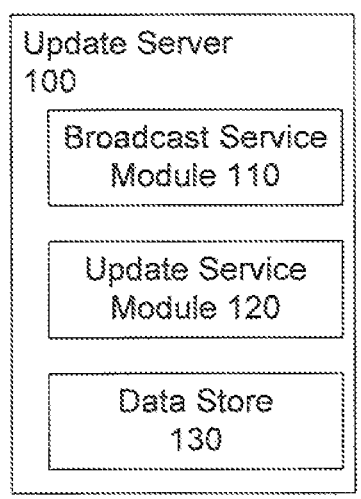
FIG. 1 is a diagram of an embodiment of a structure for an update server.

FIG. 1 illustrates one example structure of an update server 100 for managing and distributing updates to computer systems. As shown, the update server 100 is a computer system that includes a broadcast service module 110, an update service module 120, and a data store 130. The broadcast service module 110 provides a broadcast service that listens to a predetermined port (e.g., a high-level port between 1024 and 65535, such as the port 5578) for broadcast messages. In response to receiving a broadcast message from a computer system, the broadcast service module 110 generates a message including a Uniform Resource Locator (URL) where an update service is provided, and transmits the message to the computer system. In one example, the broadcast service module 110 authenticates the broadcast message based on identification information included therein, and only transmits the message including the URL upon successful authentication. The update service module 120 provides an update service that listens for messages requesting available updates, and provides information about the available updates (e.g., header information of computer files containing update information) in response. In one example, the update service module 120 is a file server (e.g., a Hypertext Transfer Protocol (HTTP) file server, a File Transfer Protocol (FTP) file server) configured to provide computer files or their header information in response to requests. In one embodiment, the update service (e.g., the file server) may be relocated (e.g., to a different computer system) and the broadcast service module 110 may rediscover the new location of the update service and provide client systems with a new URL of the update service.

The data store 130 stores data used by the update server 100. Examples of the data stored in the data store 130 include computer files containing software updates for client systems. The data store 130 may be a file system or a database stored on a non-transitory computer-readable storage medium.

In one example, an installation package can be locally or remotely installed onto the update server 100 by a user or administrator to set up the broadcast service module 110, the update service module 120, and the data store 130. In another example, the installation package can be pre-installed in the update server 100 by the manufacturer.

Figure 2:
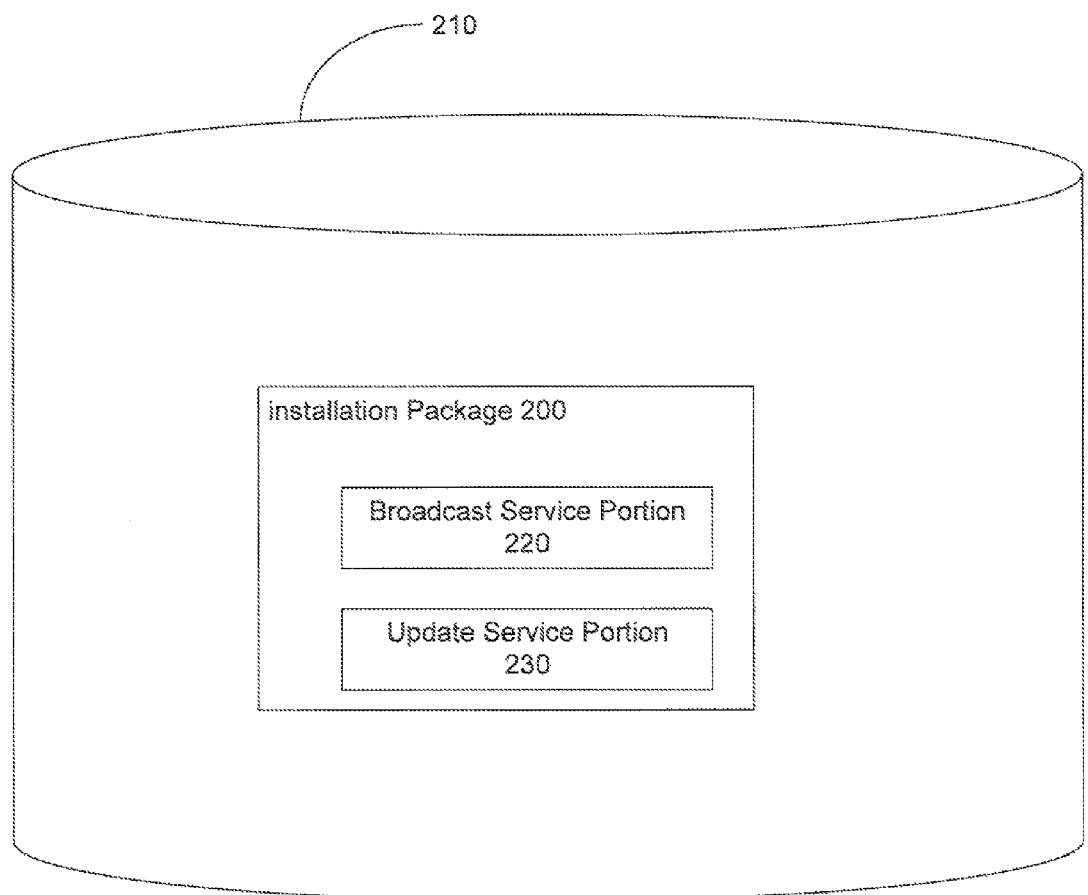
FIG. 2 is a diagram of an embodiment of a storage medium storing an installation package.

Referring to FIG. 2, a block diagram showing an example installation package 200 stored in a non-transitory computer-readable storage medium (e.g., compact disk read-only memory (CD-ROM), DVD) 210. As shown, the installation package 200 includes a broadcast service portion 220 for setting up the broadcast service module 110, an update service portion 230 for setting up the update service module 120 and storing software updates in the data store 130. In one example, the update service portion 230 can include a storage device for storing the software updates. Referring back to FIG. 1, during installation, the installation package 200 sets up the broadcast service module 110, the update service module 120, and the data store 130, and starts the broadcast service and the update service. In addition, the installation package 200 queries the update server 100 and/or a network configuration server to determine a URL where the update service can be resolved at, and configures the broadcast service to respond to requests with the URL of the update service.

Figure 3:
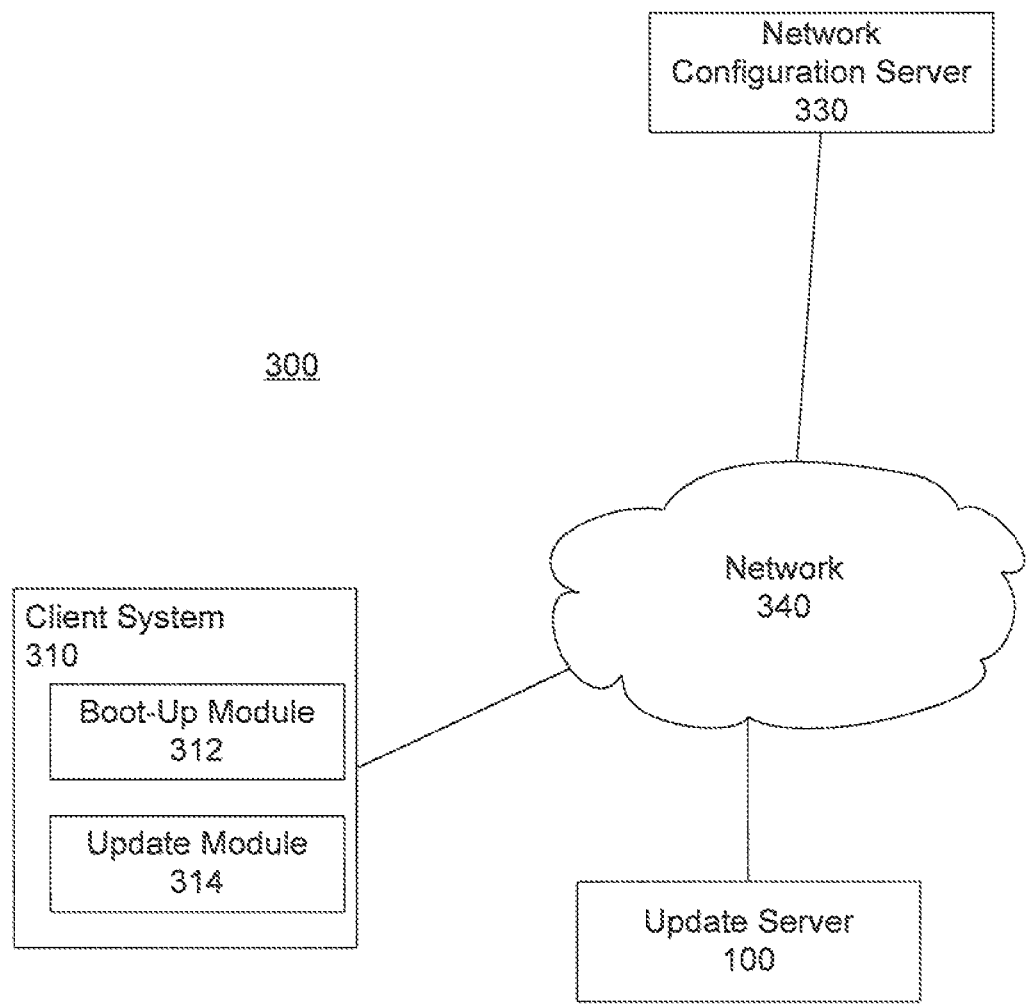
FIG. 3 is a diagram of an embodiment of a network environment including the update server shown in FIG. 1.

FIG. 3 illustrates one example network environment 300 for the update server 100 to manage and distribute updates to computer systems. As shown, the network environment 300 includes a client system 310, the update server 100, and a network configuration server 330, all connected to a network 340. One of each type of entity is illustrated for clarity in the present embodiment.

The client system 310 manages updates for its components (e.g., operating systems, applications, etc.). As shown, the client system 310 is a computer system that includes a boot-up module 312 and an update module 314. When the client system 310 is powered up, the boot-up module 312 is configured to automatically determine a network address (e.g., an Internet Protocol (IP) address) of the client system 310 and an identifier e.g., a URL, an IP address) of an update service at which the client system 310 can obtain software updates. To determine the network address of the client system 310, the boot-up module 312 broadcasts a message on a connected computer network to request a network address from an available network configuration server (e.g., a DHCP server), receives from the server a responding message containing the network address, and parses the responding message to determine the network address. To determine the identifier of the update service, the boot-up module 312 broadcasts a message containing identification information of the client system 310 (e.g., the network address, model information, etc.) on a connected computer network to a predetermined port, receives from a server (e.g., the update server 100) a responding message containing the identifier, and parses the responding message to determine the identifier. In one example, the boot-up module 312 examines the responding message from the network configuration server for a static tag indicating an identifier of an update service, and if such a static tag is present, then the boot-up module 312 parses the message for the identifier without broadcasting the message containing the identification information. The boot-up module 312 passes the identifier to the update module 314 for it to communicate with the update service.

The update module 314 uses the identifier to contact the update service for available updates. To obtain available updates, the update module 314 transmits a request for available updates to the update service as identified by the identifier, and receives from the update service information about the available updates in response. In one example, the update module 314 generates signatures (also called update signatures) for available updates based on the received information. Example information includes file header information such as file name, size, creation/last modification date and time, permissions, and metadata (e.g., file type, tags). To generate a signature for an available update, the update module 314 applies an algorithm such as a hashing algorithm to the information of the update. The update module 314 maintains a collection of signatures for updates already applied (or installed) in the client system 310, and determines whether an update has been applied in the client system 310 by searching the signature of that update in the collection for matches. If the signature has no match in the collection, the update module 314 determines that the update has not been applied and applies the update. Otherwise, if the signature has at least one match in the collection, the update module 314 determines that the update has already been applied and thus does not need to be applied again.

The network configuration server 330 automatically configures computer systems (e.g., the client system 100) connected to the network 340 such that the computer systems can communicate with other computer systems (e.g., the update server 100) on the network 340. One example of the network configuration server 330 is a Dynamic Host Configuration Protocol (DHCP) server. In response to a message from a computer system (e.g., the client system 100) requesting a network address, the network configuration server 330 assigns a network address to the computer system, and transmits to the computer system a responding message containing the assigned network address. In one example, the network configuration server 330 can be configured to include in the responding message an identifier of an update service in the network 340 identified by a static tag.

The network 340 is configured to connect the client system 100, the update server 100, and the network configuration server 330. The network 340 may be a wired or wireless network. Examples of the network 340 include an intranet, a WiFi network, a WiMAX network, a mobile telephone network, the Internet, or a combination thereof.

Figure 4:
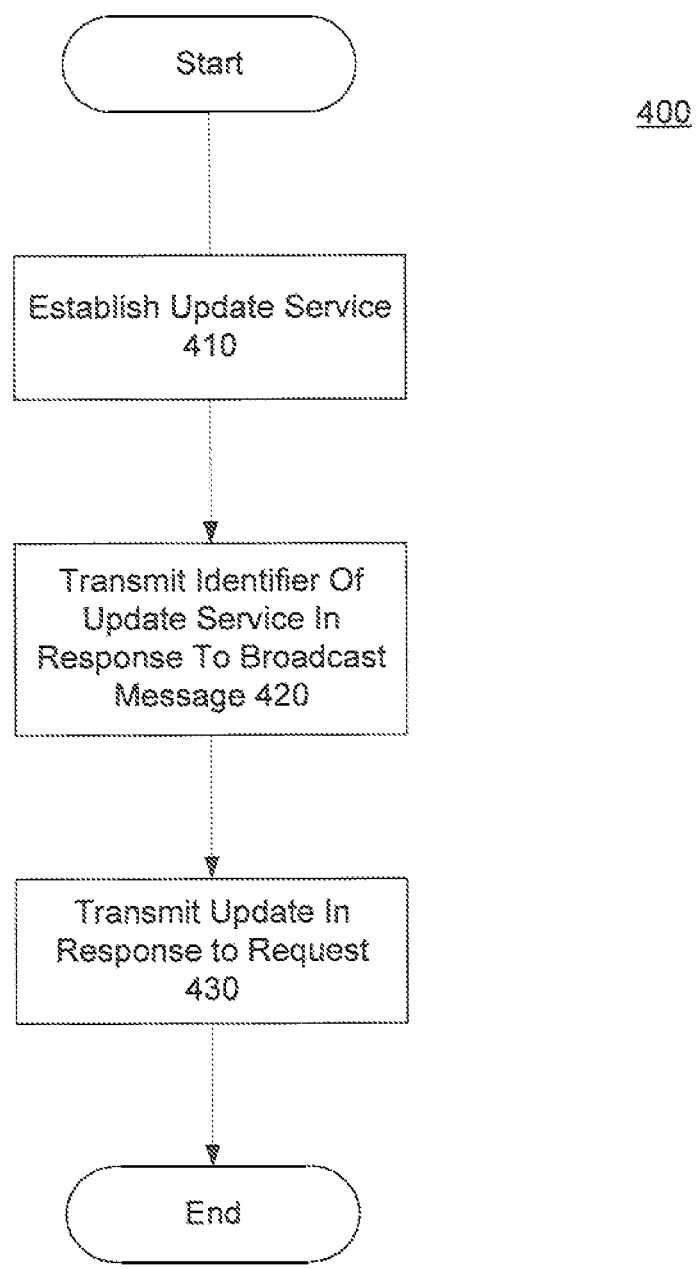
FIGS. 4-6 are diagrams of embodiments of methods for managing updates.
Figure 5:
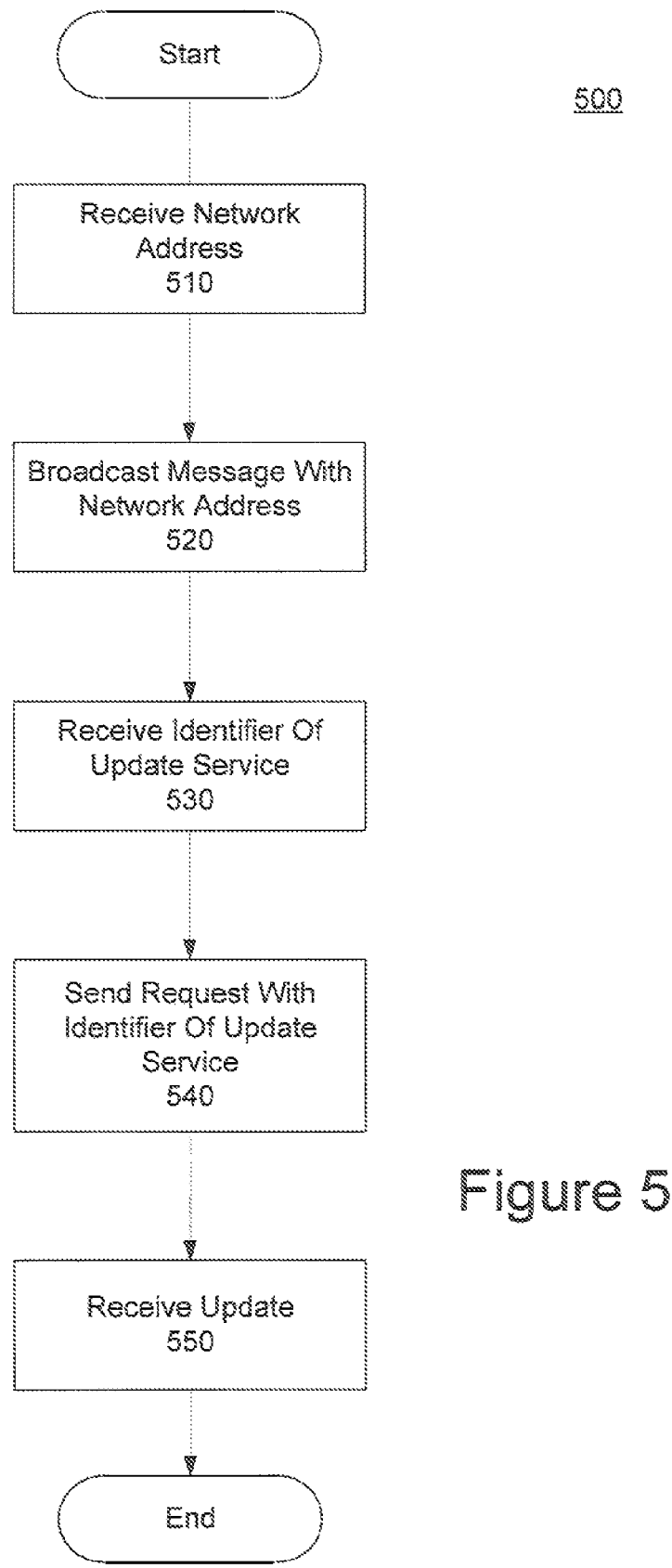
Figure 6:
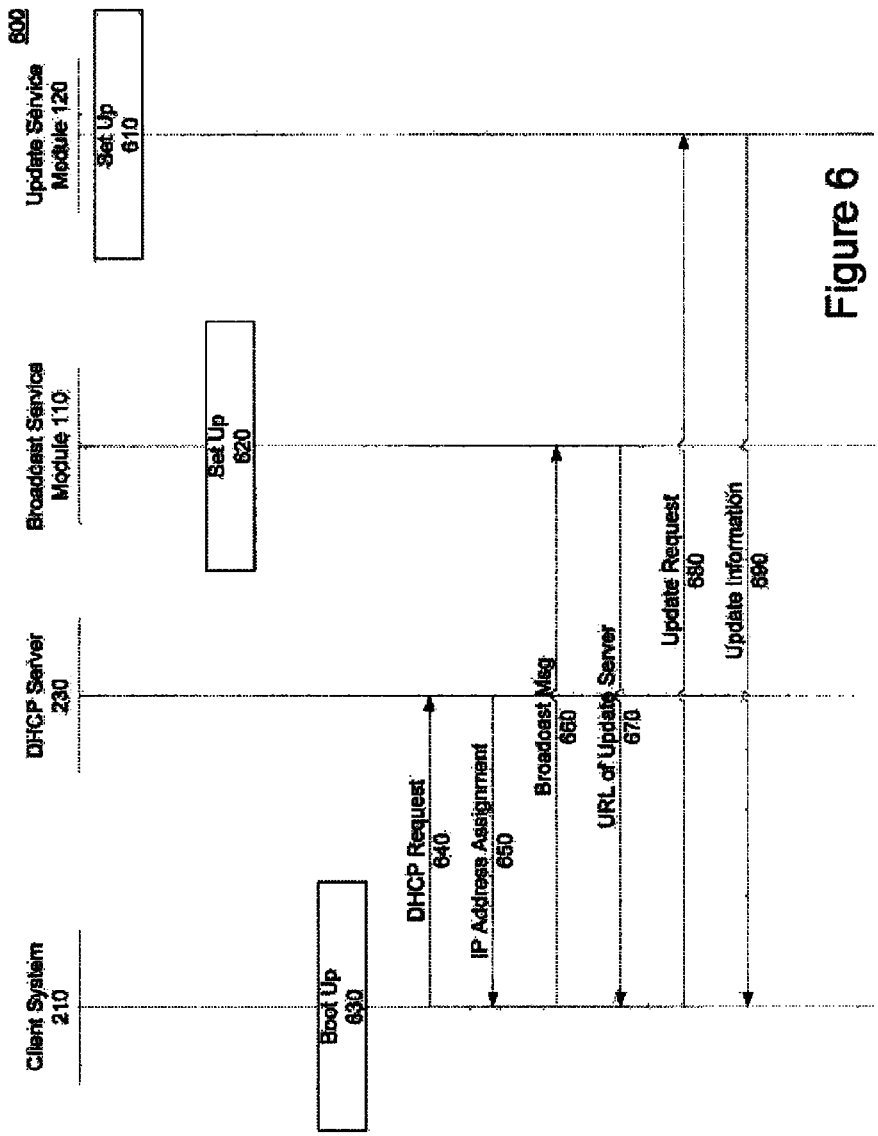

FIGS. 4-6 are flow diagrams that show example methods for the update server 100 to provide update information to the client system 310. Other examples perform the steps in different orders and/or perform different or additional steps than the ones shown.

Referring to FIG. 4, the update server 100 establishes at 410 an update service, and receives (e.g., by a broadcast service) from the client system 310 a broadcast message on a predetermined port. The update server 100 transmits at 420 to the client system 310 a message containing an identifier (e.g., the URL) of the update service in response to the broadcast message. When the update service receives from the client system 310 an update request, the update service transmits at 430 to the client system 310 information about available updates (e.g., header information of computer files containing update information).

Referring to FIG. 5, the client system 310 receives at 510 (e.g., from a DHCP server) a network address of its own in the network 340, and broadcasts at 520 a message including the network address on the network 340 to a predetermined port. The client system 310 receives at 530 a message including an identifier (e.g., a URL) of an update service and in response to the broadcast message. The client system 310 transmits at 540 a request for available updates to the update service as identified by the identifier, and receives at 550 from the update service information about the available updates.

Referring to FIG. 6, the broadcast service module 110 and the update service module 120 are set up at 610, 620 (e.g., on the update server 100). In one example, the broadcast service module 110 listens to a predetermined port for broadcast messages. The client system 310 boots up at 630 and broadcasts at 640 a DHCP request in the network 340 to discover the DHCP server 330 and request for an IP address. The DHCP server 330 assigns an IP address to the client system 310 and transmits at 650 the IP address back to the client system 310. The client system 310 broadcasts at 660 a message containing the IP address on the network 340 to the predetermined port. The broadcast service module 110 receives the broadcast message, and transmits at 670 to the client system 310 a message including the URL of the update service provided by the update service module 120. The client system 310 transmits at 680 a request for available updates addressed to the URL. The update service receives the request and in response transmits at 690 to the client system 310 information about the available updates.

Figure 7:
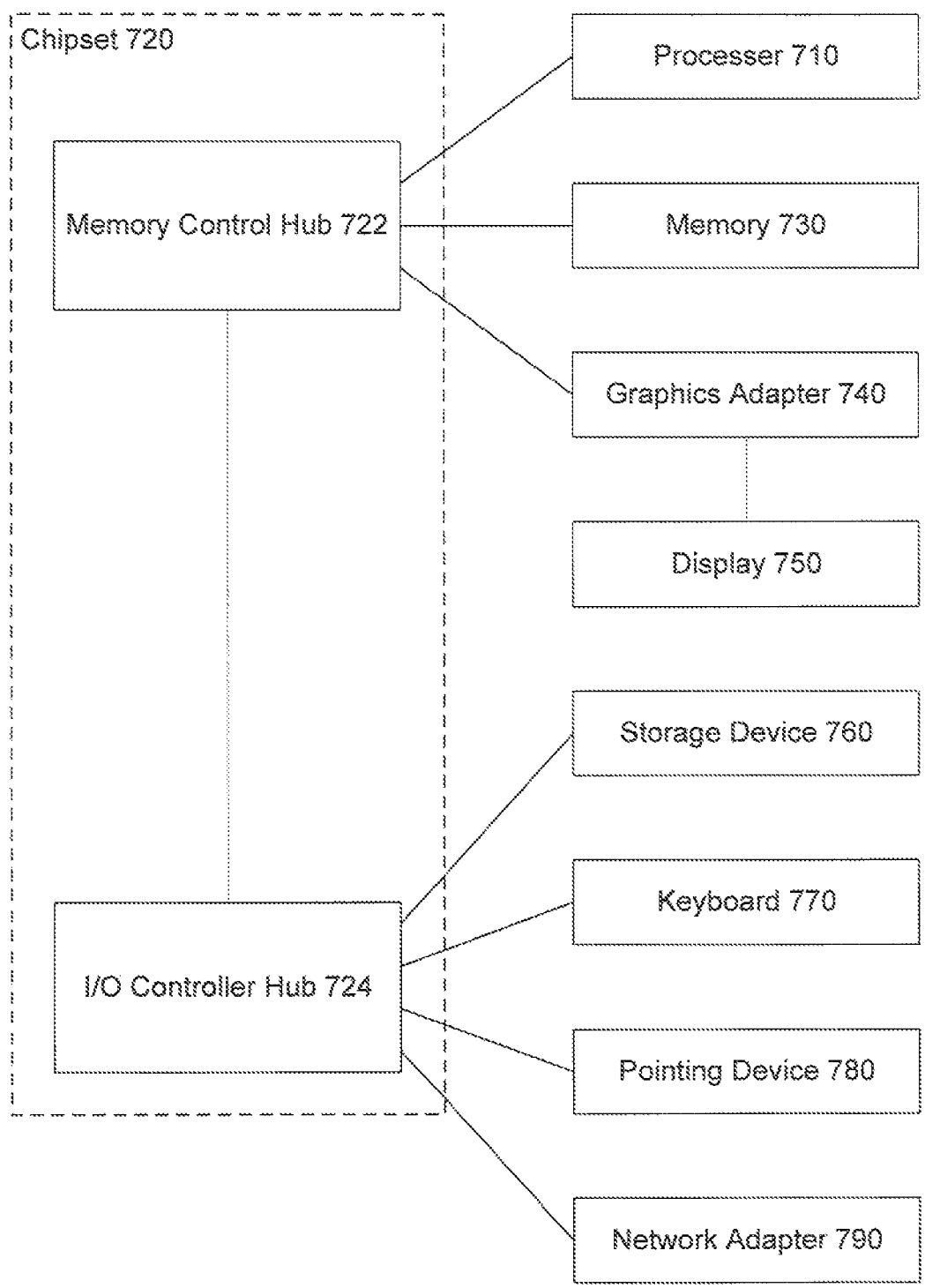
FIG. 7 is a diagram of an example of a computer system.

In one example, the entities shown in FIGS. 1-5 are implemented using one or more computer systems. FIG. 7 is a high-level block diagram illustrating an example computer system (also called a computing device) 700. The computer system 700 includes at least one processor 710 coupled to a chipset 720. The chipset 720 includes a memory controller hub 722 and an input/output (I/O) controller hub 724. A memory 730 and a graphics adapter 740 are coupled to the memory controller hub 722, and a display 750 is coupled to the graphics adapter 740. A storage device 760, a keyboard 770, a pointing device 780, and a network adapter 790 are coupled to the I/O controller hub 724. Other embodiments of the computer system 700 have different architectures.

The storage device 760 is a non-transitory computer-readable storage medium such as a hard drive, compact disk read-only memory (CD-ROM), DVD, or a solid-state memory device. The memory 730 holds instructions and data used by the processor 710. The pointing device 780 is a mouse, track ball, or other type of pointing device, and is used in combination with the keyboard 770 to input data into the computer system 700. The graphics adapter 740 displays images and other information on the display 750. The network adapter 790 couples the computer system 700 to one or more computer networks.

The computer system 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 760, loaded into the memory 730, and executed by the processor 710.

The types of computer systems 700 used by entities can vary depending upon the embodiment and the processing power required by the entity. For example, the update server 100 might comprise multiple blade servers working together to provide the functionality described herein. As another example, the client system 310 might comprise a mobile telephone with limited processing power. A computer system 700 can lack some of the components described above, such as the keyboard 770, the graphics adapter 740, and the display 750. In addition, one or more of the entities may be implemented in a cloud computing environment. As used herein, cloud computing refers to a style of computing in which dynamically scalable and often virtualized resources are provided as a service over the Internet.

One skilled in the art will recognize that the configurations and methods described above and illustrated in the figures are merely examples, and that the described subject matter may be practiced and implemented using many other configurations and methods. It should also be noted that the language used in the specification has been principally selected for readability and instructional purposes, and may not have been selected to delineate or circumscribe the inventive subject matter. Accordingly, the disclosure of the described subject matter is intended to be illustrative, but not limiting, of the scope of the subject matter, which is set forth in the following claims.

What is claimed is:

1. A method for providing software updates to a client computing device, comprising:
   establishing an update service associated with an update service network address;
   responsive to receiving from the client computing device a broadcast message comprising a port identifier designated for receiving messages requesting available updates and addressed from a client computing device network address of the client computing device, transmitting to the client computing device network address a response message comprising the update service network address; and
   responsive to receiving from the client computing device an update request message addressed to the update service network address, sending to the client computing device network address information for updating software on the client computing device.

2. The method of claim 1, further comprising:
   establishing a broadcast service for listening to broadcast messages comprising the port identifier designated for receiving messages requesting available updates, wherein the broadcast message addressed from the client computing device network address is received by the broadcast service.

3. The method of claim 2, further comprising:
   installing an installation package onto an update server, wherein establishing the update service comprises installing the update service onto the update server by the installation package, and
   wherein establishing the broadcast service comprises installing the broadcast service onto the update server by the installation package.

4. The method of claim 1, wherein the update service is established on a second computing device, and the information for updating software on the client computing device comprises header information of a file residing on the second computing device.

5. The method of claim 1, wherein the information for updating software on the client computing device comprises an update package.

6. The method of claim 1, wherein the update service comprises a file server, and the information for updating software on the client computing device stored in a file in the file server.

7. A non-transitory computer-readable storage medium having computer program instructions recorded thereon for setting up a first computing device to provide software updates to a second computing device, the computer program instructions comprising:
   a first portion to set up a first module in the first computing device that establishes an update service associated with an update service network address; and
   a second portion to determine the update service network address and to set up a second module in the first computing device, the second module configured to transmit to a second computing device network address of the second computing device a message comprising the update service network address in response to receiving a broadcast message comprising a port identifier designated for receiving messages requesting available updates and addressed from the second computing device a network address,
   wherein the update service sends to the second computing device network address information for updating software on the second computing device in response to receiving from the second computing device an update request message addressed to the update service network address.

8. The storage medium of claim 7, wherein the second module is further configured to establish a broadcast service for listening to broadcast messages comprising the port identifier designated for receiving messages requesting available updates, wherein the broadcast message addressed from the second computing device is received by the broadcast service.

9. The storage medium of claim 7, wherein the update service is established on a third computing device, and the information for updating software on the second computing device comprises header information of a file residing on the third computing device.

10. The storage medium of claim 7, wherein the information for updating software on the second computing device comprises an update package.

11. The storage medium of claim 7, wherein the update service comprises a file server, and the information for updating software on the second computing device is stored in a file in the file server.

12. A client computing device, comprising:
   a first module executable by a processor of the computing device to receive a client computing device network address of the computing device in a computer network, transmit a broadcast message comprising a port identifier designated for receiving messages requesting available updates and addressed from the client computing device network address, and receive a message comprising an update service network address associated with an update service in response to the broadcast message; and
   a second module executable by the processor to send an update request message addressed to the update service network address, and receive information for updating software on the client computing device from the update service in response to the update request message.

13. The client computing device of claim 12, wherein the first module is further configured to transmit a request for the client computing device network address during a boot up process, and receive a message with the client computing device network address in response to the request for the client computing device network address.

14. The client computing device of claim 12, wherein the update service is hosted on a second computing device, and the information for updating software on the client computing device comprises header information of a file residing on the second computing device.

15. The client computing device of claim 12, wherein the client computing device is preconfigured with port identifier.

16. The client computing device of claim 12, wherein the information for updating software on the client computing device comprises an update package.

17. The client computing device of claim 12, wherein the update request message comprises a request for a file on a file server.

18. The client computing device of claim 17, wherein the update request message further comprises a request for header information of the file.

* * * * *

UNITED STATES PATENT AND TRADEMARK OFFICE
CERTIFICATE OF CORRECTION

| | | |
|---|---|---|
| PATENT NO. | : 9,609,085 B2 | Page 1 of 1 |
| APPLICATION NO. | : 13/193452 | |
| DATED | : March 28, 2017 | |
| INVENTOR(S) | : Fletcher Liverance et al. | |

It is certified that error appears in the above-identified patent and that said Letters Patent is hereby corrected as shown below:

In the Claims

In Column 6, Line 3, in Claim 6, delete "device stored" and insert -- device is stored --, therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*